United States Patent [19]

Kahle

[11] Patent Number: 5,518,325
[45] Date of Patent: May 21, 1996

[54] DISK LABEL PRINTING

[75] Inventor: Rolf D. Kahle, Saratoga, Calif.

[73] Assignee: Compulog, Saratoga, Calif.

[21] Appl. No.: 203,211

[22] Filed: Feb. 28, 1994

[51] Int. Cl.⁶ ............................................. B41J 5/30
[52] U.S. Cl. .................... 400/70; 400/73; 156/384; 369/84
[58] Field of Search ................... 369/15, 84, 85, 369/86; 347/105, 106, 108; 400/70, 73; 101/70, 35; 156/387, 384, 385; 360/81

[56] References Cited

U.S. PATENT DOCUMENTS

| | | | |
|---|---|---|---|
| 4,562,489 | 12/1985 | Gaskell et al. | 360/39 |
| 4,811,325 | 3/1989 | Sharples, Jr. et al. | 369/85 |
| 4,866,462 | 9/1989 | Watanabe | 346/140 |
| 4,954,968 | 9/1990 | Yamaguchi et al. | 364/519 |
| 4,989,181 | 1/1991 | Kuo | 369/33 |
| 5,018,884 | 5/1991 | Hirano et al. | 347/24 |
| 5,019,846 | 5/1991 | Goto et al. | 354/217 |
| 5,023,728 | 6/1991 | Nimura et al. | 358/437 |
| 5,033,038 | 7/1991 | Kobayashi et al. | 369/36 |
| 5,036,503 | 7/1991 | Tomita | 369/36 |
| 5,056,073 | 10/1991 | Fitzgerald et al. | 369/36 |
| 5,093,750 | 3/1992 | Park et al. | 360/19 |
| 5,099,465 | 3/1992 | Geiger et al. | 369/36 |
| 5,101,388 | 3/1992 | Fushimi | 360/36 |
| 5,148,403 | 9/1992 | Gardner | 360/15 |
| 5,161,233 | 11/1992 | Matsuo et al. | 355/218 |
| 5,317,337 | 5/1994 | Ewaldt | 347/2 |

*Primary Examiner*—John S. Hilten
*Attorney, Agent, or Firm*—Townsend and Townsend and Crew

[57] ABSTRACT

A method and system for individually labelling a recording medium at the time that digital information is recorded thereon is provided. The method provides for transferring at least a portion of the digital information in the form of a digital data stream to the medium from a storage location. Title information is extracted from the data stream and used to create a visual label that is placed on the recording medium. The title information on the recording medium uniquely identifies the digital information that is recorded on the medium. In an exemplary embodiment, the system of the invention will use a controller to receive a portion of the digital data stream stored in the storage location. A recorder is in communication with the controller for receiving the data stream from the controller and for recording the data stream on the recording medium. A printer is also in communication with the controller for receiving the title information from the controller and for producing the visual label having the title information on the recording medium. Preferably, the recording medium will be a compact disk, and the printer will be a laser or ink jet type printer that is integrated into the recording device to allow the label to be printed on the compact disk as the compact is either delivered to or ejected from the recording device.

34 Claims, 5 Drawing Sheets

DISK LABEL PRINTING

BACKGROUND OF THE INVENTION

1. Field of the Invention

The present invention provides a system and methods for placing a visual label on a recording medium. In particular, the invention is directed to the individual placement of a visual label on a recordable optical disk at the time that digital information is recorded thereon.

The recordable compact disk is a compact disk capable of having digital information recorded thereon when placed in a compact disk recorder that receives the digital information from a computer. Recordable compact disks are referred to as "CD-Rs". Recordable compact disks differ from CD-ROMs which have digital information imprinted on a surface of the disk using a stamping procedure. The stamping procedure allows CD-ROMs to be replicated in bulk quantities. Another popular optical disk is the "write once read many times" (WORM) disk.

The CD-R and "write once read many times" disks are rapidly becoming the media of choice for distributing and archiving large data files. Because of their lower cost, compact size, and easy data accessibility, it is probable that these disks may replace magnetic media in an increasing number of applications.

When using the CD-R or other optical disks for data distribution and/or archiving, it is important to label the disks adequately. Because the CD-R is not mass-produced, it is not cost effective to silk screen a label on the disk as is the current method with the CD-ROM. Instead, present methods for labeling the CD-R include manually writing identification information on a label and attaching the label to the disk, or by taking a felt-tip pen or marker and writing identification information on the surface of the disk itself. However, such techniques are time consuming and are also error prone.

It would therefore be desirable to provide a system and method for individually printing or attaching labels on each disk immediately before or after it is recorded, without requiring the manual writing of identification information on a separate label that is to be attached to the disk, or the manual writing of information on the disk itself. By eliminating this kind of labeling, the greatest product quality and integrity as well as improved production cycle time can be assured.

2. Description of the Background Art

U.S. Pat. No. 5,148,403 describes a system capable of reading a reel of magnetic tape containing a number of different programs to determine which segments of the tape contain each respective program. The system then provides for each segment of tape to be cut and spliced onto individual cassette tapes. Information on the tape can be used to print a label for each of the cassette tapes.

U.S. Pat. No. 4,562,489 describes a tape recorder capable of recording digital information on a plurality of data tracks.

U.S. Pat. Nos. 4,954,968 and 4,886,462 describe printing systems, such as ink jet printers, that can be used to print identifying information.

U.S. Pat. No. 4,989,191 describes a storage unit for housing a plurality of disks that can be accessed by a robot arm to allow the information to be read from the disk.

U.S. Pat. No. 5,019,846 describes a camera capable of printing information directly on a photograph.

U.S. Pat. No. 5,181,081 describes a print scanner for detecting defects in the label of a compact disk.

The following patents describe various systems for handling disks: U.S. Pat. Nos. 5,036,503; 5,056,073; 5,033,038; 5,101,388; and 5,099,465.

SUMMARY OF THE INVENTION

The present invention provides systems and methods for individually labelling a recording medium at the time that digital information is recorded thereon.

In one embodiment of the method of the present invention, at least a portion of the digital information that is stored at a storage location is transferred in the form of a digital data stream to the medium. Extracted from this data stream is title information. A visual label having the extracted title information thereon is placed on the recording medium. Preferably, the visual label will be directly printed on the recording medium by ejecting ink from an laser or ink jet type printer. In another embodiment, the visual label is placed on the recording medium by printing the title information on a tag and attaching the tag to the recording medium. Preferably, the recording medium will be a recordable compact disk and the label will be printed only on a defined area of the compact disk. This area is located between an outer edge portion and an inner edge portion of a non-recordable surface of the disk.

In another embodiment of the method of the present invention, at least a portion of the digital information that is stored in a storage location is transferred in the form of a first digital data stream to the medium. A visual label having title information produced from a second data stream (produced independently of the first data stream) is placed on the recording medium. In one aspect, the title information is composed by manually entering the title information into a computer to convert the title information into the second digital data stream. The second data stream can then be transferred to a printer to print the title information directly on the recording medium. Alternatively, the second data stream can be transferred to a printer to print the title information on a tag which is attached to the recording medium.

The invention further provides a system for individually labelling a recording medium at the time that digital information is recorded thereon. The system has a controller for receiving at least portion of a digital data stream that is stored in a storage location. A recording device is in communication with the controller for receiving the digital data stream from the controller and for recording the digital data stream on the recording medium. A printer is also in communication with the controller and/or the recorder for receiving title information from the controller or recorder and for producing a visual label having the title information. The title information uniquely identifies the digital information that is recorded on the medium. Preferably, the recording medium will be a recordable compact disk.

In one aspect of the system, the controller has means for extracting the title information from the digital data stream which is being recorded. Alternatively, the controller can be provided with means for manually entering the title information from a user terminal.

In one embodiment of the system, the printer will have means for producing the label directly on the compact disk. This will preferably be an ink ejecting print head on the printer for ejecting ink on the compact disk. In another embodiment, the printer will produce a separate label which will be automatically attached to the compact disk.

In another aspect of the system, the recording device will have a recording chamber and a carriage for delivering and ejecting the compact disk to and from the recording chamber. The carriage is slidable in an axial direction to deliver and eject the disk to or from the recording chamber. The printer also has a print head slidably mounted on the recording device over the path of the carriage. The print head is slidable in a direction that is perpendicular to the axial travel of the carriage. In this manner, the visual label can be printed anywhere on the surface of the disk as the disk is either delivered to or ejected from the recording device.

In a further embodiment of the system, a printer is located outside the recording device. The printer has a slidably mounted print head to enable the print head to travel in an axial direction. Means are provided for moving the compact disk beneath the print head in a direction perpendicular to the travel of the print head. In this manner, the visual label can be produced directly on the compact disk immediately before or after the disk is delivered to the recording device.

The invention further provides for a recordable compact disk having a first surface for recording digital information and a second surface opposite the first surface. The second surface has an annular blank area having no printed information thereon between an outer edge portion and an inner edge portion for receiving a visual identification label.

DETAILED DESCRIPTION OF SPECIFIC EMBODIMENTS

The present invention provides a system and methods for individually labelling a recording media by placement of an individually produced label on each medium at the time that digital information is recorded on the medium. "Recording medium" includes any type of portable medium capable of storing digital information, such as an optical, a laser, or a compact disk, or the like, or any type of magnetic media, and capable of having the digital information retrieved therefrom.

By "individually labeling" it is meant that labelling occurs immediately before or after digital information is recorded on the disk, and that the disk is provided with a visual label that uniquely identifies the digital information which had been or will be transferred. The digital information stored on the disk will typically be unique from the information stored on any other disk. For example, if a company's customer records were alphabetically stored on a set of disks, one of the disks may have the records of customers whose names begin with the letters A–M, while another disk contains the records of customers having names beginning with the letters N–Z. Other examples are almost limitless. That is not to say that no two disks will ever contain the same information, but that a primary objective of this invention is the bulk storage of data for archival and other purposes. This differs from CD-ROMs which typically have the same digital information replicated in mass.

By a visual label is meant that title information on the label is human readable (the preferred embodiment) or machine readable (such as when the label is in the form of a bar code). The title information will uniquely identify the information recorded on the CD-R. The title information can include, but is not limited to, the name of the particular database file being recorded on the CD-R, a brief description of the type of information recorded on the CD-R, a table of contents, or the like. Further, the title information can contain information relating to distribution, mailing, filing, retrieval, security, controlled copy number, etc.

As previously described, the type of disk that is preferable for individually labeling is the CD-R. The CD-R is preferable because unique information can conveniently and economically be recorded on each disk, unlike the CD-ROM where it would be uneconomical to stamp each disk with a different stamp. Also unlike the CD-ROM, the CD-R does not have title information silkscreened on a surface. Since the title information on the CD-R is typically unique, it would not be convenient or economical to use a different silkscreen for each CD-R. Therefore, the system and method of the present invention provide for "individually labelling" a CD-R at the time that digital information is recorded on the CD-R.

Exemplary CD-Rs are available from a variety of commercial suppliers such as 3M, St. Paul, Minn. Once the CD-R has digital information recorded thereon, the digital information can then be retrieved by playing the CD-R in a conventional CD-ROM reader. As described in detail hereinafter, the commercially supplied CD-R has one surface for recording the digital information and a second surface on the opposite side of the disk which has the manufacturer's information and also space for manually applying a visual label, typically by using a felt-tip pen or marker.

Digital information is recorded on the CD-R by a compact disk recorder. Digital information includes any kind of information that can be communicated to a person by sight or sound that has been put in the form of digital quanta, typically in binary form. This is commonly referred to as "digitizing" information. For example, textual information, analog sound signals, and other forms of information can be digitized by conventional techniques, e.g. converting an analog signal to a digital signal in an analog-to-digital converter, inputting textual information using keyboards, scanners, and the like.

Once information has been digitized, it can be transferred from one location to another by various different mechanisms such as by electrical or light pulses, or the like. When a series electrical or light pulses are used to transfer the digital data, the pulses are referred to as a digital data stream. A compact disk recorder will receive digital information from a digital data stream and record the digital information on the CD-R.

Suitable compact disk recorders are available from JVC Information Products Company of America, Huntington Beach, Calif., or Microboards Inc. of America, Carver, Minn. Typical compact disk recorders can receive the digital information from most standard personal and other computer systems. An acceptable system is a 33 mHz 486-based system with 4 MB RAM.

Data to be recorded on the media will be transferred from any type of storage location capable of storing and transferring large amounts of digital information. Acceptable types of storage locations can include the memory of most large computer systems (including personal computers having sufficient memory), reels of magnetic tape, floppy disks, compact disks, and any other similar devices capable of storing information in bulk.

Figure 1:
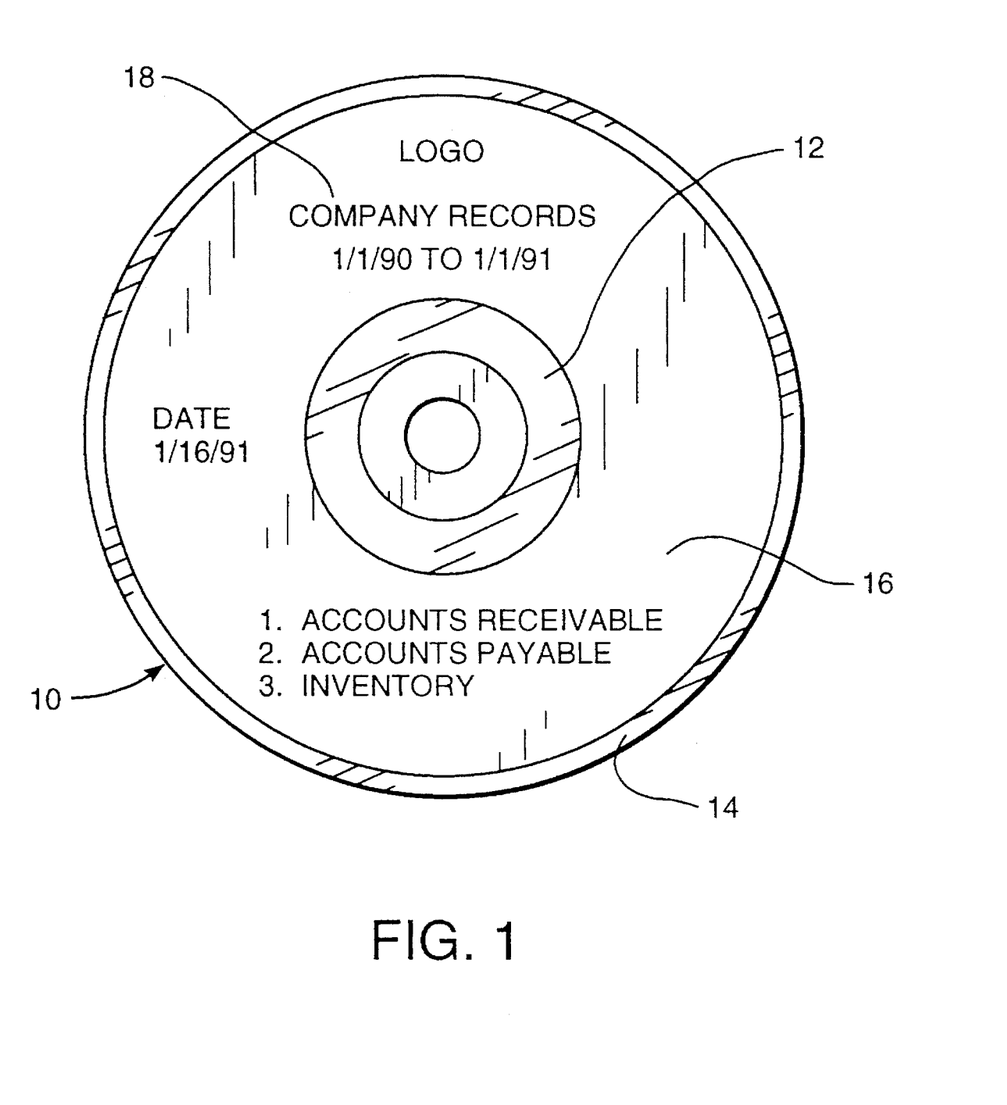
FIG. 1 shows a compact disk having a label that has been printed directly on a surface of the compact disk.

Turning now to the drawings, the system and methods of the present invention will be described in detail. In FIG. 1, a recordable compact disk (CD-R) 10 is shown. The CD-R 10 is a conventional recordable compact disk having a nonrecordable surface that has been modified. The CD-R 10 has a concentric inner portion 12 and a concentric outer portion 14. The inner and outer portions 12 and 14 are reserved for the disk manufacturer's logo, serial number, batch number, date, etc., and an annular labelling portion 16 will be left blank. By leaving the labelling portion 16 blank, the rotational position of the CD-R 10 does not have to be controlled when a label 18 is printed on the disk. Usually, the information in the label 18 will be printed is straight rows across the labelling portion 16. By insuring that the manufacturer's information is not on the labelling portion 16, the label 18 will not be overprinted on the manufacturer's information, thereby insuring clear visual access to the label 18.

Figure 2:
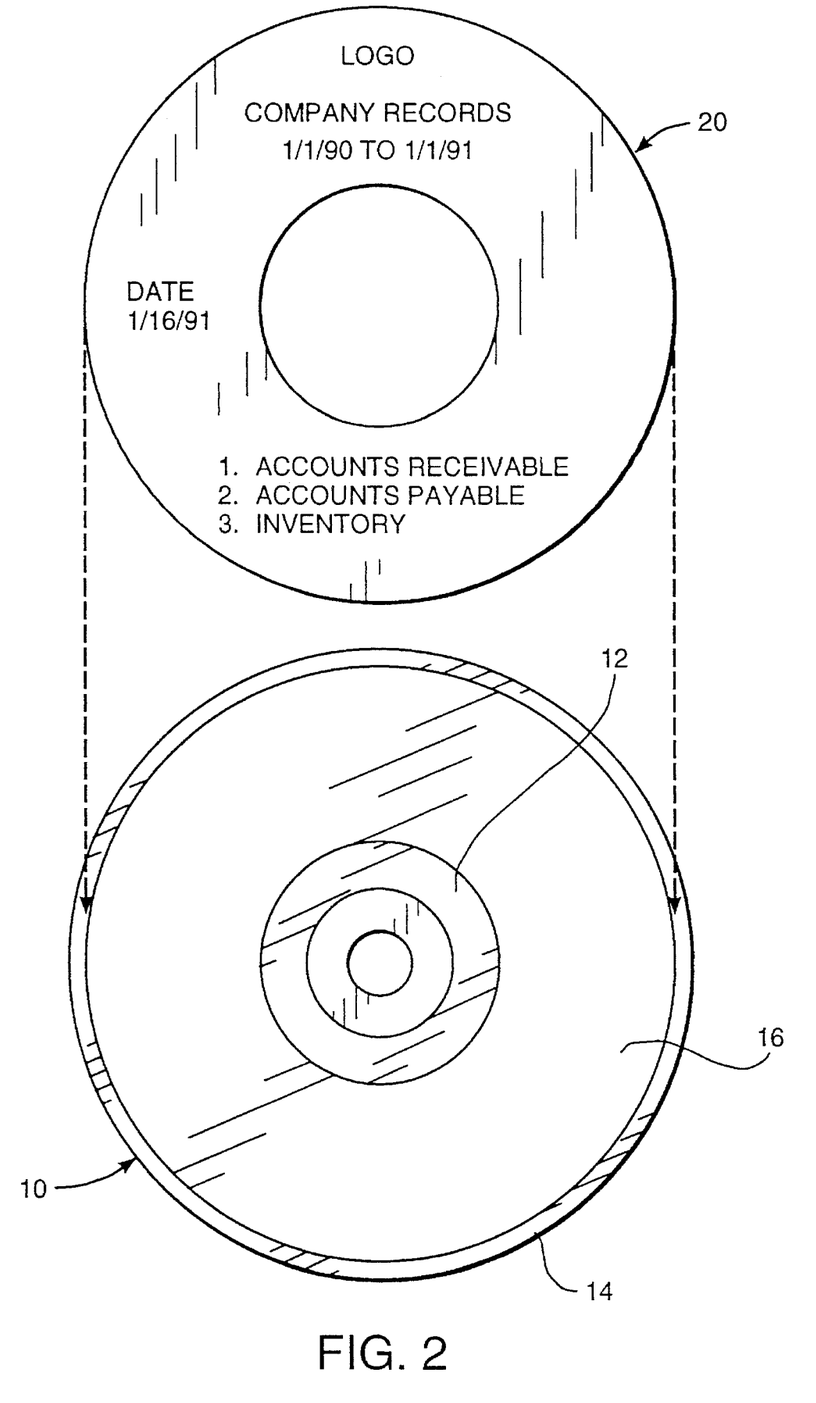
FIG. 2 shows a compact disk and a separately printed visual label that is to be attached to the compact disk.

In FIG. 1, the label 18 is printed directly on the CD-R 10 and is a visual label that is human readable. FIG. 2 shows the CD-R 10 of FIG. 1 except that label 18 is not printed directly on the labelling portion 16. Instead, an attachable label 20 which has been separately printed can be attached to the labelling portion 16. As will be described in detail hereinafter, the attachable label 20 can be separately printed by any conventional printer or labeller. Preferably, the attachable label 20 will have a self-adhesive on one side to allow the label 20 to easily be attached to the labelling portion 16 of the CD-R 10. The attachable label 20 will contain identical title information as just discussed in connection with FIG. 1.

Figure 3:
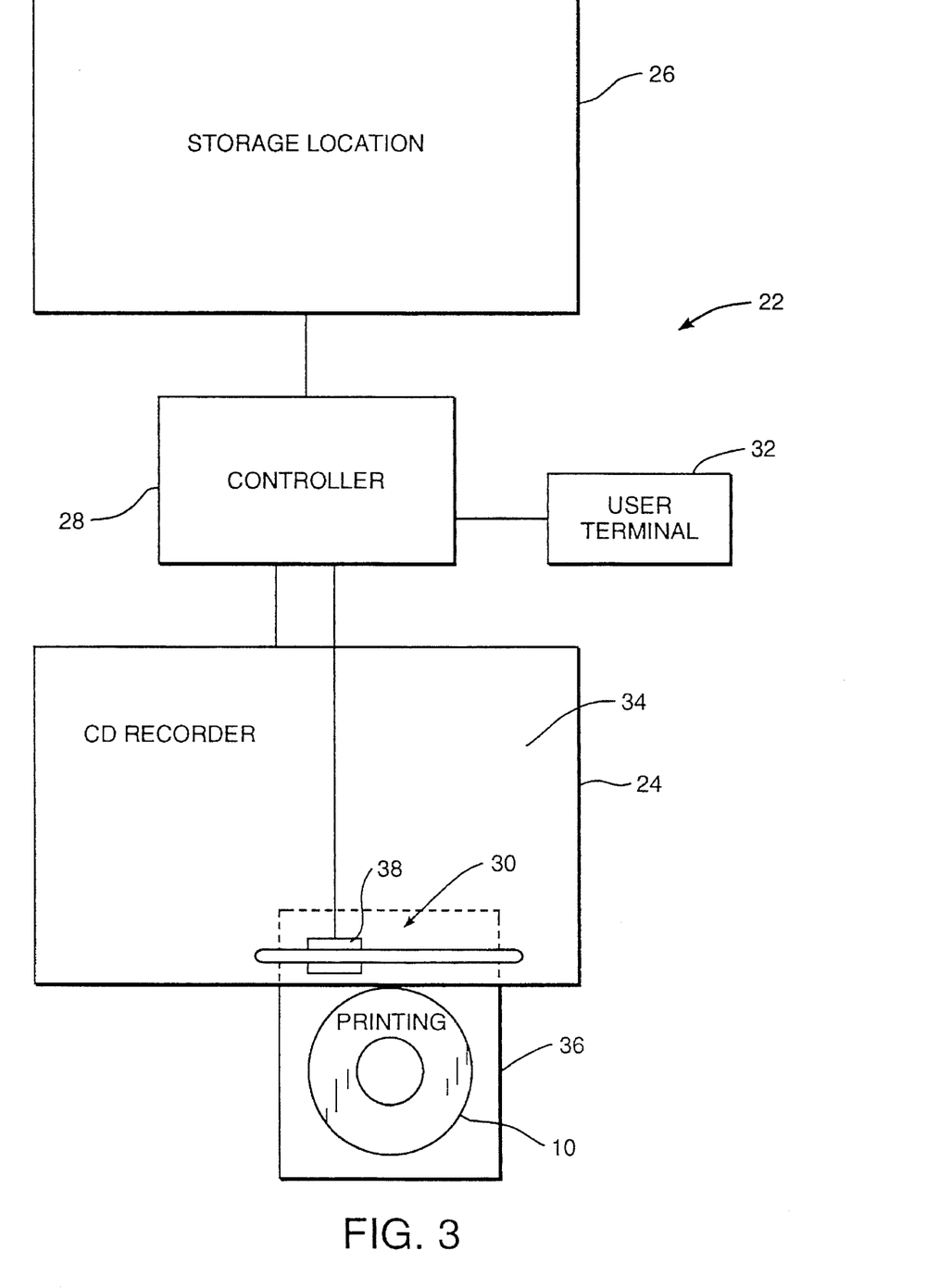
FIG. 3 shows a system for printing a visual label directly on a compact disk while the compact disk is either being delivered to or ejected from a recording device.

FIG. 3 shows a system 22 for printing a label directly on the CD-R 10 while the CD-R 10 is either being delivered to or ejected from a compact disk recorder 24. The information to be recorded on the CD-R 10 is stored in a data storage location 26.

To transfer the digital information in the storage location 26, a computer or controller 28, or the like, is placed in communication with the storage location 26. The transfer of digital information from the storage location 26 is controlled by the controller 28, where a digital data stream is created which is fed to the CD recorder 24. Interfaces between the storage location 26 and the controller 28 as well as between the controller 28 and the CD recorder 24 for transferring the data stream are well known in the art, e.g. SCSI. In many cases, the storage location 26 will be part of the computer system which defines the controller 28. That is, the present invention will frequently be used for downloading information from an integrated computer system onto the CD-R 10.

In a first embodiment, a portion of the digital data stream that is transferred to the CD recorder 24 can be extracted by the controller 28 and delivered to a printer 30. The portion of the data stream that is extracted by the controller 28 contains title information as previously described. The title information is sent to the printer 30 to print a visual label on the CD-R 10. To extract the portion of the digital data stream having the title information, the controller 28 uses software available from vendors such as Bell & Howell, Chicago, Ill. This software uses parameter tables to parses the data stream, extract data fields, and compose the title information. In this manner, the printer 30 can produce the visual label on the CD-R 10 without human intervention. This allows the CD-R 10 to be individually labelled with a visual label having title information that was directly obtained from the digital information that is also recorded on the CD-R 10.

In a second embodiment, instead of using the controller 28 to extract a portion of the digital data stream that is to be recorded on the CD-R 10, a user terminal 32 that is in communication with the controller 28 can be used to manually enter the title information into the controller 28. The user terminal 32 can be a conventional keyboard allowing the title information to be manually typed into the controller 28. The information that was entered from the user terminal 32 can then be sent to the printer 30 in digital form in a manner similar to that previously described in order to produce the visual label on the CD-R 10.

Alternatively, the CD recorder 24 can be configured so that the digital information received through the SCSI interface from the controller 28 can be directed to the printer from the CD recorder 24. To accomplish this, the CD recorder 24 extracts a portion of the digital information having the title information and then sends the title information to the printer 30 which will then produce the label on the CD-R 10. In this manner, the controller 28 is not required to be in communication with the printer 30.

The CD recorder 24 has a recording chamber 34 and a motorized carriage or disk tray 36, for delivering the CD-R 10 to or from the recording chamber 34. Most, if not all, conventional CD recorders are provided with such a motorized disk tray for moving the CD-R 10 to and from the recording chamber 34. The present invention replaces the drive subsystem in a conventional CD recorder with a drive system similar to drive systems used to transport paper in conventional laser or ink jet printers. In this manner, the CD-R 10 can be positioned by the disk tray 36 by either delivering or ejecting the CD-R 10 to or from the recording chamber 34 in a manner similar to the way a sheet of paper is advanced in a conventional laser or ink jet printer.

The printer 30 has an ink ejecting print head 38 that is slidably mounted on a track that is perpendicular to the axial movement of the disk tray 36. By having the print head 38 slidably mounted over the disk tray 36, any area on the CD-R 10 can be made available for receiving ink from the print head 38 as the disk tray 36 is axially slid into or out from the recording chamber 34 and as the print head 38 moves in a direction perpendicular to the axial movement of the disk tray 36.

When the printer 30 is connected to the controller 28, the preferable physical electronic interface to be used is a standard Centronics-type parallel interface for data communications. This interface is generally standard on most personal computers. The print head 38 will preferably use a commercially available ink which is capable of adhering to a variety of surfaces, and will generally adhere to surfaces of commercially available CD-Rs. One type of commercially available ink is BK2301, which is an ink for electronic marking sold by Domino Amjet, Inc., Gurnee, Ill. This ink will generally have good adherence on glass, ceramics, polyethylene, PVC, and other types of plastics and will usually dry quickly and resist freon, gasoline, oil and alcohol.

The printer 30 is capable of printing both text and graphics, and can also use black or colored ink. If desired, the label to be printed on the CD-R 10 can contain a company logo, identification, or the like, that can be pre-entered as a form into the controller 28. This form can then be merged with the title information to form an aesthetically pleasing label. Preferably, the title information will be recorded in a TIFF format (FAX format). The TIFF format is a commonly known format. Once the title information has been stored in the TIFF format on the CD-R 10, it can be recalled from the CD-R 10 when copying the digital information on the CD-R 10 to another recordable compact disk and used by the printer to reproduce the label on the other disk. Storing the title information in the TIFF format allows for an easy transfer of the title information to the printer.

The printer 30 can be constructed from parts used in commercially available laser or ink jet type printers. One commercially available printer having the necessary parts is the Canon Bubble Jet Printer BJ-200, available from Canon Inc., Tokyo, Japan. Alternatively, the parts used in commercially available ink jet printers can be modified and scaled down to reduce the size of the combined CD recorder 24 and printer 30.

The method for individually labelling the compact disk using the system 22 will next be described. The storage location 26 having the digital information is first transferred to the controller 28. Preferably, this will be accomplished by placing the controller 28 in communication with the storage location 26 and downloading the information in the storage location 26 into the controller 28. As previously described, the controller 28 may have a memory large enough to house all of the information in the storage location 26. In this case, the information in the storage location 26 can be originally entered into the controller 28.

The CD-R 10 is placed in the disk tray 36. The digital information is sent from the controller 28 to the compact disk recorder 24. After the disk tray 36 delivers the CD-R 10 into the recording chamber 34, the digital information is recorded on the CD-R 10. The controller 28 extracts title information from the data stream delivered to the CD recorder 24. This title information is transferred to the printer 30 and the print head 38 ejects ink on the CD-R 10 to produce a visual label as the CD-R 10 is either delivered to or ejected from recording chamber 34. The title information extracted by the controller 28 can be a part of the digital information originally contained in the storage location 26, or the title information can be manually entered by the user terminal 32 into the controller 28. When the title is manually entered into the controller 28 by the user terminal 32, a second digital data stream is created. The controller 28 is able to direct this second digital data stream having the title information to the printer 30 at the time that the digital information from the storage location 26 is recorded in the CD-R 10. In this manner, the controller 28 insures that the manually entered title information will be printed on the correct CD-R 10.

Alternatively, the CD recorder 24 can extract the title information from the digital data stream and deliver the title information to the printer 30. The print head 38 will produce the title on the labeling portion 16 of the CD-R 10 as previously described in connection with FIG. 1.

Figure 4:
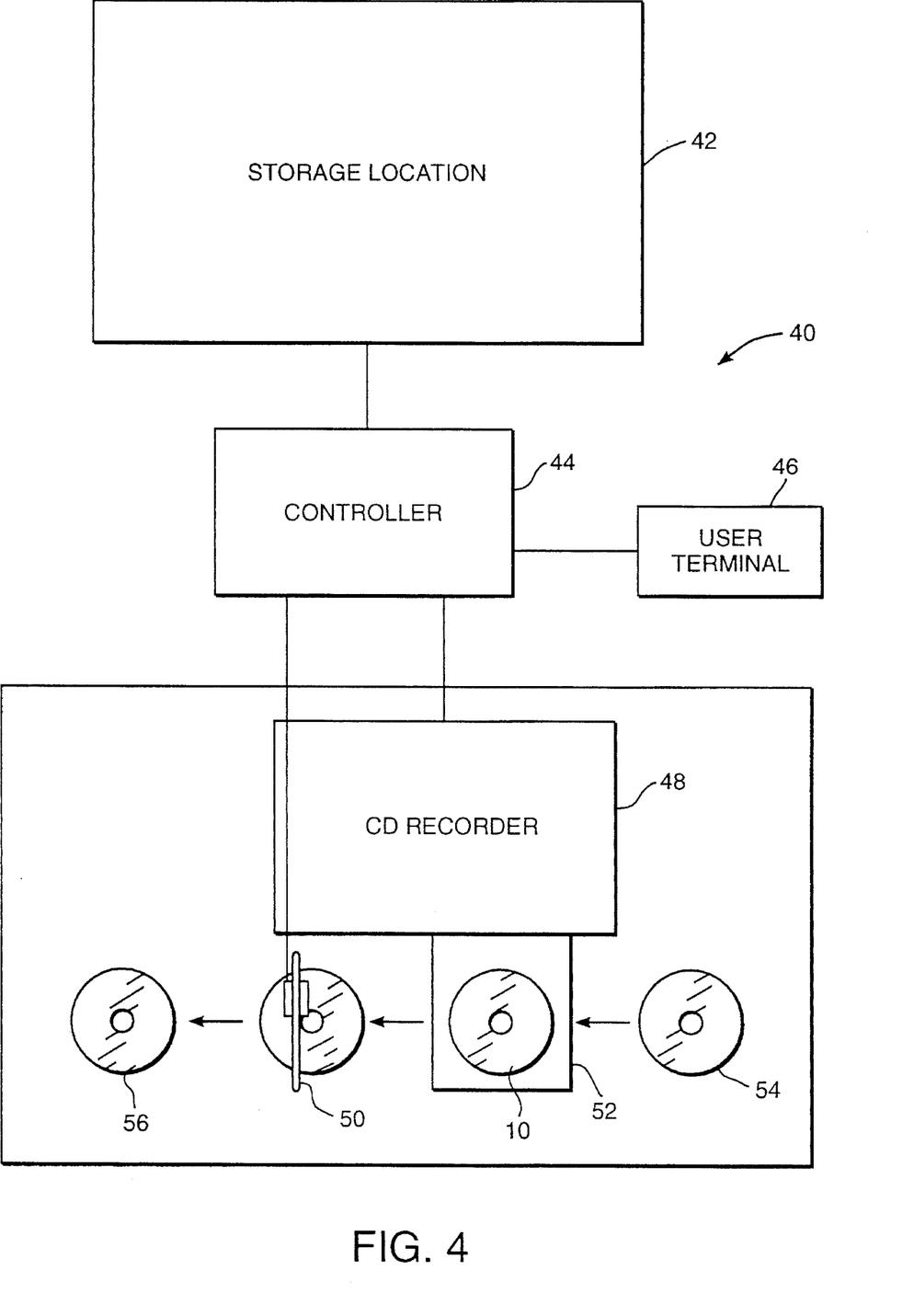
FIG. 4 shows a system for printing a visual label directly on a compact disk using a printer that is located outside the recording device.

FIG. 4 shows a system 40 for printing a label directly on a recordable compact disk at a printing station located outside a recording device just prior to or after the time that digital information is recorded on the disk. The system 40 is configured so that it is able to record information on one disk while printing a label on another disk. The system 40 has a storage location 42, a controller 44, a user terminal 46, and a CD recorder 48 that are substantially identical to the CD recorder 24, the storage location 26, the controller 28, and the user terminal 32 of FIG. 3. The difference between the system 40 of FIG. 4 and the system 22 of FIG. 3 is that a printer 50 is located outside the CD recorder 48. Thus, the CD-R 10 does not have a label printed on it while either being delivered to or ejected from the CD recorder 48 by a disk tray 52. Instead, the printer 50 is located outside of the CD recorder 48 so that the CD-R 10 can travel through the printer 50 to receive a label either directly before or directly after being delivered to the CD recorder 48.

The system 40 is particularly advantageous when the CD recorder 48 is used to record a number of CD-Rs in sequence. By physically locating the printer 50 outside the CD recorder 48, recording times and labeling times can be overlapped. The printer 50 is placed outside of the CD recorder 48 so that while one CD-R 10 is being recorded, another CD-R that has just had information recorded thereon, or is next in line to be recorded, can have a label placed thereon.

To assist in recording multiple CD-Rs, some compact disk recorders, such as one produced by Eastman Kodak Company, supply blank disks in disk packs containing 75 disks. The blank disks are stored in a blank disk stack 54. A mechanical arm or other automated mechanism (not shown) automatically delivers a disk from the blank disk stack 54 to the CD recorder 48. After the CD-R 10 is recorded, it is automatically removed from the CD recorder 48 and delivered to an output stack 56. This pattern is followed until each disk in the blank stack 54 is recorded and placed in the output stack 56.

The printer 50 is located between the CD recorder 48 and the output stack 56, so that a label can be printed on the disk before reaching the output stack 56. Alternatively, the printer 50 can be placed between the blank stack 54 and the CD recorder 48 so that the label is printed on the disk before reaching the compact disk recorder 48. System 40 therefore allows a number of blank CD-Rs to be recorded in sequence and to have an individual label printed on each disk. The label has title information that uniquely identifies the digital information recorded on the disk immediately before or after being delivered to the compact disk recorded 48. This eliminates any manual labelling of CD-Rs after reaching the output stack 56, and also increases the speed with which a number of CD-Rs can be recorded in sequence and labeled.

The printer 50 can be a conventional ink jet printer that has been adapted to receive a CD-R. The conventional ink jet printer will be modified so that the CD-R can travel in a straight path through the printer without being bent. The CD-R will be supported in a tray in order to protect the recording surface of the CD-R as the CD-R 10 passes through the printer 50. In one embodiment, the mechanism used to transfer the CD-Rs to and from the CD recorder 48 can be modified to perform the additional task of delivering the CD-R 10 to the printer 50 and removing the CD-R 10 from the printer once the label has been placed thereon.

The method for individually labelling the CD-R 10 using the system 40 will next be described. The method of delivering the digital information to the controller 44 and from the controller 44 to the CD recorder 48 and/or the printer 50 is substantially identical to the method described in connection with FIG. 3. The CD-R 10 is initially placed in the blank stack 54. The automatic mechanism (not shown) automatically delivers the CD-R 10 from the blank stack 54 to the disk tray 52. The disk tray 52 then delivers the CD-R 10 to the CD recorder 48 which records the digital information thereon. The CD-R 10 is then ejected from the CD recorder 48 and automatically delivered to the printer 50 by the automatic mechanism. The printer 50 then prints title information in the form of a label on the CD-R 10 which uniquely identifies the digital information that was just recorded on the CD-R 10. The CD-R 10 is then automatically delivered to the output stack 56. Alternatively, the printer 50 can be located between the blank stack 54 and the CD recorder 48 so that the printer 50 prints the label on the CD-R 10 immediately before the CD-R 10 is delivered to the CD recorder 48.

Figure 5:
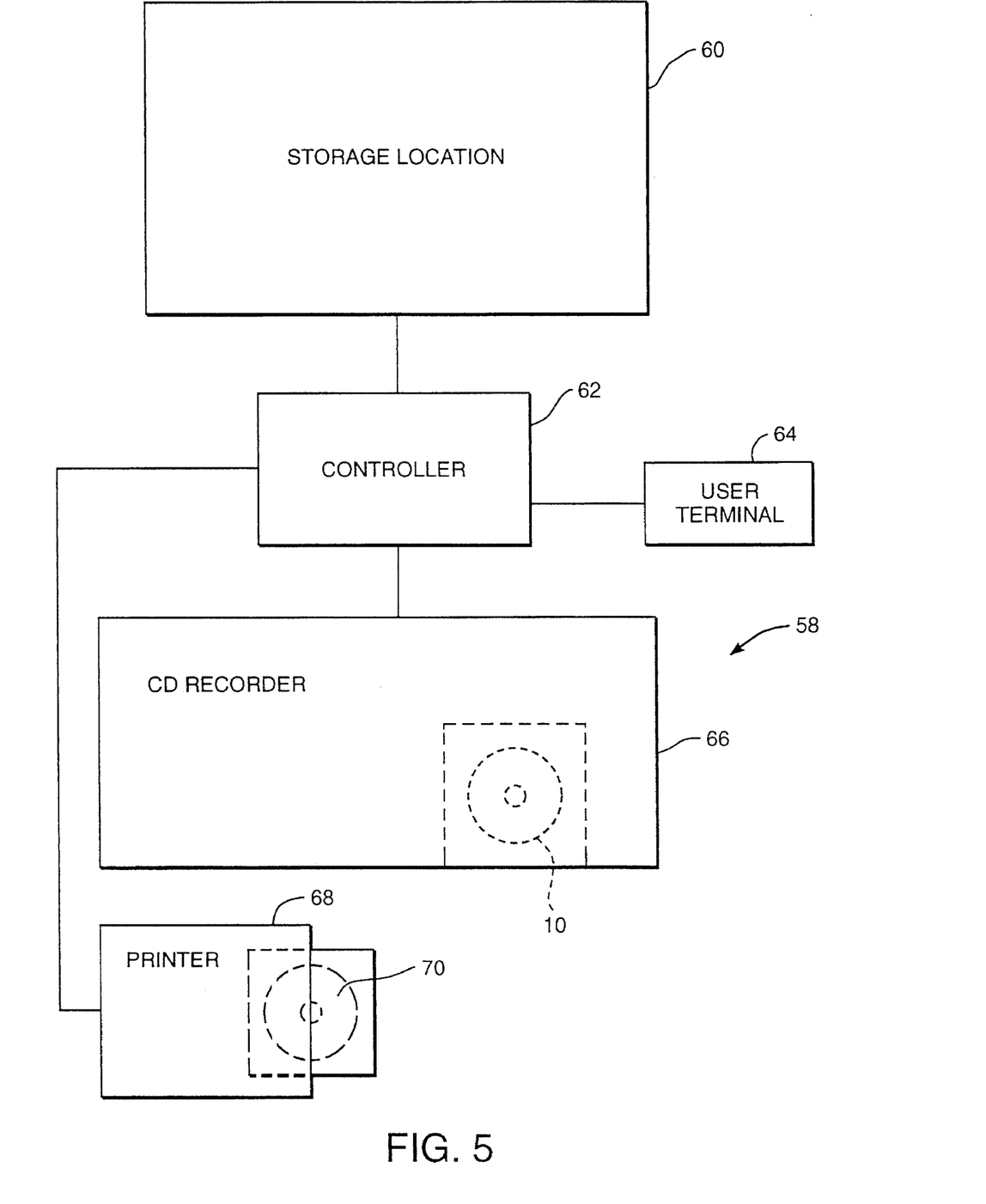
FIG. 5 shows a system for recording digital information on a compact disk and for producing a visual label which can then be attached to the compact disk.

FIG. 5 shows a system 58 for labelling a compact disk at the time that digital information is recorded thereon by printing a separate label that can be attached to the compact disk. The system 58 has a storage location 60, a controller 62, a user terminal 64, and a CD recorder 66 that are substantially identical to CD recorder 24, storage location 26, controller 28, and user terminal 32 of the system 22 described in connection with FIG. 3. Unlike the systems described in connection with FIG. 3, however, the system 58 does not print a label directly on the CD-R. Instead, a printer 68 prints the title information on a tag 70 that can be attached to the CD-R 10. The printer 68 can be any type of printer or labeller that is capable of interfacing with the controller 62. Preferably, the printer 68 will be an ink jet printer. The tag 70 will be constructed of any type of thin material that is capable of travelling through the printer 68 and having the title information printed thereon. Preferably, the tag 70 will be constructed of paper and will have a self-adhesive on one side. This will allow the tag 70 to be placed on the CD-R 10 either immediately before or after the CD-R 10 has the digital information recorded thereon. Preferably, a mechanical device (not shown) will be used to deliver the tag 70 from the printer 68 and attach it to the CD-R 10. Because the CD-R 10 has a blank annular area, the tag 70 need only be centered on the CD-R 10 and does not need to be rotationally aligned.

Although the foregoing invention has been described in some detail by way of illustration and example, for purposes of clarity of understanding, it will be obvious that certain changes and modifications may be practiced within the scope of the appended claims.

What is claimed is:

1. A method for individually labeling a recording medium at the time that digital information is recorded thereon, the method comprising:

placing the recording medium in a digital recorder;

transferring at least a portion of the digital information in the form of a digital data stream to the digital recorder from a storage location and recording the transferred digital information onto the medium;

extracting title information from the data stream; and printing and placing a visual label comprising the title information on the recording medium without human intervention and while the medium is within the recorder.

2. The method of claim 1, wherein the step of placing the label comprises printing the title information directly on the recording medium.

3. The method of claim 2, further comprising ejecting ink from an ink jet printer at the recording medium to print the title information on the recording medium.

4. The method of claim 3, wherein the recording medium comprises a recordable compact disk.

5. The method of claim 4, further comprising printing the label only on a defined area of the compact disk, the defined area comprising an area between an outer edge portion and an inner edge portion of a non-recordable surface of the compact disk.

6. The method of claim 1, the step of placing the label comprises printing the title information on a tag and attaching the tag to the recording medium.

7. A method for individually labeling a recording medium at the time that digital information is recorded thereon, the method comprising:

placing the recording medium in a digital recorder;

transferring at least a portion of the digital information in the form of a first digital data stream to the digital recorder from a storage location and recording the transferred digital information onto the medium;

composing title information in the form of a second digital data stream that uniquely identifies the digital information recorded on the medium; and printing and placing a visual label comprising the title information on the recording medium while the medium is in the digital recorder.

8. The method of claim 7, wherein the title information is composed by manually entering the title information into a computer to covert the title information into the second digital data stream.

9. The method of claim 8, wherein the step of placing the label comprises transferring the second data stream to a printer to print the title information directly on the recording medium.

10. The method of claim 9, further comprising ejecting ink from the printer at the recording medium to print the title information on the recording medium.

11. The method of claim 10, wherein the recording medium comprises a recordable compact disk.

12. The method of claim 11, further comprising printing the label only on a defined area of the compact disk, the defined area comprising an area between an outer edge portion and an inner edge portion of a non-recordable surface of the compact disk.

13. The method of claim 8, wherein the step of placing the label comprises transferring the second data stream to a printer to print the title information on a tag and attaching the tag to the recording medium.

14. A method for individually labeling a first recording medium at the time that digital information is copied from a second recording medium, the method comprising:

placing the first recording medium in a digital recorder;

transferring at least a portion of the digital information in the form of a digital data stream from the second recording medium to the first recording medium while the first recording medium is in the digital recorder;

extracting title information from the data stream; and printing and placing a visual label comprising the title information on the first recording medium while the first recording medium is in the digital recorder.

15. A system for individually labeling a recording medium at the time that digital information is recorded thereon, the system comprising:

a controller for receiving at least a portion of a digital data stream stored in a storage location;

a digital recording device in communication with the controller for receiving the data stream from the controller and for recording the data stream on the recording medium;

a printer in communication with the controller or the digital recording device for receiving title information from the controller and for producing a visual label comprising the title information, said printer having a print head which directly places the visual label on the recording medium while in the digital recording device, the title information uniquely identifying the digital information recorded on the medium.

16. The system of claim 15, wherein the controller has means for extracting the title information from the data stream.

17. The system of claim 15, wherein the controller has means for manually entering the title information from a user terminal.

18. The system of claim 15, wherein the recording medium comprises a recordable compact disk.

19. The system of claim 18, wherein the print head comprises an ink ejecting print head for ejecting ink on the directly on the compact disk.

20. The system of claim 18, further comprising means for attaching the label to the compact disk.

21. The system of claim 18, wherein the recording device comprises a recording chamber and means for delivering and ejecting the compact disk to and from the recording chamber.

22. The system of claim 21, wherein the means for delivering and ejecting comprises a carriage slidably mounted on the recording chamber.

23. The system of claim 22, wherein the carriage is slidable in an axial direction to deliver and eject the compact disk to or from the recording chamber when the carriage is axially slid toward or away from the recording chamber.

24. The system of claim 23, wherein the print head is slidably mounted on the recording device over a path of the carriage defined by the axial travel of the carriage as the carriage is slid to or from the recording chamber.

25. The system of claim 24, wherein the print head is mounted along an axis perpendicular to the carriage, whereby the print head is able to be positioned over any location on the surface of the compact disk when the disk is delivered or ejected from the recording chamber.

26. The system of claim 15, wherein the printer is an ink jet or laser printer.

27. The system of claim 26, wherein the ink jet printer is configured to eject black or colored ink at the surface of the recording medium.

28. A method for individually labeling a plurality of recording media when recording digital information thereon, the method comprising:

placing a selected recording medium selected from the plurality of recording media in a digital recorder;

transferring at least a portion of the digital information in the form of a digital data stream to the digital recorder from a storage location and recording the transferred digital information onto the selected recording medium; and printing and placing without human intervention a visual label comprising title information extracted from the storage location on another recording medium selected from the plurality of recording media while the selected recording medium is within the digital recorder and while the digital information is being recorded thereon.

29. The method of claim 28, further comprising placing the other recording medium in the digital recorder and recording a different portion of the digital information from the storage location thereon, the different portion of the digital information being associated with the title information.

30. The method of claim 29, wherein the visual label is placed on the other recording medium before the digital information is recorded thereon.

31. The method of claim 29, wherein the visual label is placed on the other recording medium after the digital information is recorded thereon.

32. The method of claim 28, further comprising directly printing the visual label on the other recording medium.

33. A method for individually labelling a recording medium having digital information stored thereon, the method comprising:

placing the recording medium in a digital reader;

reading title information from the recording medium; and printing and placing a visual label comprising the title information on the recording medium without human intervention while the medium is within the reader.

34. A method for individually labelling a recording medium, the method comprising:

placing the recording medium in a digital recorder and recording digital information thereon;

reading title information from the recording medium; and printing and placing a visual label comprising the title information on the recording medium without human intervention while the medium is within the recorder.

* * * * *